United States Patent
Ratouis et al.

[15] 3,679,802
[45] July 25, 1972

[54] METHOD OF PREVENTING CONVULSIONS

[72] Inventors: Roger Ratouis, Saint Cloud; Jacques Robert Boissier, Paris, both of France

[73] Assignee: Roussel Uclaf, Paris, France

[22] Filed: Oct. 7, 1970

[21] Appl. No.: 78,961

[30] Foreign Application Priority Data

Oct. 8, 1969 France..................................6934369

[52] U.S. Cl...........................................................424/285
[51] Int. Cl. .........................................................A61k 27/00
[58] Field of Search..................................................424/285

[56] References Cited

OTHER PUBLICATIONS

Chemical Abstracts 55:516 b(1961).

Primary Examiner—Jerome D. Goldberg
Attorney—Hammond & Littell

[57] ABSTRACT

Novel anticonvulsant composition containing as the active ingredient, 3,3-dimethyl-1-phenyl-1-acetamidophthalanne of the formula

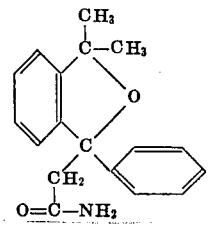

I and to a novel method of preventing convulsions in warm-blooded animals.

2 Claims, No Drawings

METHOD OF PREVENTING CONVULSIONS

OBJECTS OF THE INVENTION

It is an object of the invention to provide novel anticonvulsant compositions.

It is a further object of the invention to provide a novel method of preventing or treating convulsions in warm-blooded animals.

These and other objects and advantages of the invention will become obvious from the following detailed description.

THE INVENTION

The novel anticonvulsant compositions of the invention are comprised of an effective amount of 3,3-dimethyl-1-pheryl-1-acetamido-phthalanne and a pharmaceutical carrier. The compositions are usually administered orally and are absorbed through the digestive tract. The compositions may be solids or liquids in the usual form used for human medicine such as tablets, simple or dragees, gelatin coated pills, syrups or suspensions produced in the usual manner.

The pharmaceutical carrier can be any one of the normal excipients used in pharmaceutical compositions such as talc, arabic gum, lactose, starch, magnesium stearate, aqueous or non-aqueous vehicles, various wetting agents, dispersants or emulsifiers and preserving agents. The usual individual dose contains 50 to 500 mg of the said product when administered orally to humans.

Due to the remarkable anticonvulsant activity of the compositions of the invention, they are useful as a medicine in human therapy, particularly as an anticonvulsant and psychotropic medicines. They are useful for the treatment of epilepsies of diverse nature.

The novel method of the invention for combatting convulsions comprises administering to warm-blooded animals a safe and effective amount of 3,3-dimethyl-1-phenyl-1-acetamido-phthalanne. The said product is usually administered at a daily dose of 1.5 to 15 mg/kg to humans.

The product, 3,3-dimethyl-1-phenyl-1-acetamido-phthalanne is described in the literature only as a chemical product. It can be prepared by the method described by Pavlova et al. [Zh. Obshch. Khim., Vol. 30 (1960) p. 735–742] by by reacting 3,3-dimethyl-1-phenyl-1-carboxyl methyl-phthalanne with first thionyl chloride and then ammonia.

In the following examples there are described several preferred embodiments to illustrate the invention. However, it should be understood that the invention is not intended to be limited to the specific embodiments.

EXAMPLE I

PREPARATION OF 3,3-dimethyl-1-phenyl-1-acetamido-phthalanne

A mixture of 129 gm (0.46 mole) of 3,3-dimethyl-1-phenyl-1-carboxylmethyl-phthalanne and 600 cc of thionyl chloride was refluxed for 45 minutes and was then cooled. The excess thionyl chloride was removed by concentration in vacuo and then the liquid residue was poured with very energetic stirrinG into 1,700 cc of an aqueous 28 percent ammonia solution. The precipitate formed was recovered by vacuum filtration and was dried to obtain 95 gm (74 percent yield) of 3,3-dimethyl-1-phenyl-1-acetamido-phthalanne which after crystallization from ethyl acetate occurred in the form of white crystals instantaneously melting at 146°C.

Analysis: $C_{18}H_{19}NO_2$
| | | |
|---|---|---|
| Calculated: % C 76.8 | % H 6.8 | % N 5.0 |
| Found: 76.7 | 6.7 | 5.0 |

EXAMPLE II

Compressed tablets were prepared by thoroughly admixing 200 gm of 3,3-dimethyl-1-Phenyl-1-acetamido-phthalanne with 300 gm of an excipient and compressing the resulting mixture into tablets weighing 500 mg each.

PHARMACOLOGICAL STUDY

The anticonvulsant activity of the product of the invention by electroshock to mice with auricular electrodes using a current of 40 volts with a duration of 0.3 seconds was determined. By oral administration of the product, the mice were protected 100 percent for 3 hours at a dose of 200 mg/kg and for 1½ hours at a dose of 100 mg/kg.

In another test, the product of the invention was administered orally to mice at a rate of 200 mg/kg 30 minutes before a subcutaneous injection of 140 mg/kg of pentetrazole and the product retarded the clonic convulsions and suppressed the tonic convulsions normally provoked by this dose of pentetrazole.

Various modifications of the compositions and method of the invention may be made without departing from the spirit or scope thereof and it is to be understood that the invention is to be limited only as defined in the appended claims.

We claim:

1. A method of preventing convulsions in warm-blooded animals which comprises orally administering to warm-blooded animals an effective anticonvulsive amount of 3,3-dimethyl-1-phenyl-1-acetamido-phthalanne.

2. The method of claim 1 wherein the warm-blooded animal is a human.

* * * * *